Jan. 27, 1959 S. LUTSKER 2,870,536
TUBING CUTTER
Filed Aug. 26, 1957 2 Sheets-Sheet 1

INVENTOR.
SIMON LUTSKER
BY
ATTORNEYS

Jan. 27, 1959     S. LUTSKER     2,870,536
TUBING CUTTER

Filed Aug. 26, 1957     2 Sheets-Sheet 2

INVENTOR.
SIMON LUTSKER
BY
ATTORNEYS

United States Patent Office 2,870,536
Patented Jan. 27, 1959

2,870,536

TUBING CUTTER

Simon Lutsker, Shaker Heights, Ohio

Application August 26, 1957, Serial No. 680,129

9 Claims. (Cl. 30—102)

This invention relates, as indicated, to a tubing cutter.

A primary object of the invention is to provide a tubing cutter which is effective for cutting a large variety of sizes of tubing.

Another object of the invention is to provide a tubing cutter of the character described, having a cutting wheel and tubing engaging or support rollers which are maintained substantially equidistant from each other circumferentially of the tubing, irrespective of the size of the tubing which is being cut, whereby deviation of the cutter from the cutting plane is avoided or minimized.

A further object of the invention is to provide a tubing cutter of the character described, having an arrangement of springs and cam surfaces therein which function to automatically position the support rollers at the proper distance from each other during adjustment of the cutter for cutting various sizes of tubing.

A further object of the invention is to provide a tubing cutter of the character described, having a symmetrical arrangement of its parts, whereby the cutter is at all times balanced, and handling and use thereof is greatly facilitated.

A still further object of the invention is to provide a tubing cutter of the character described, in which means have been provided for permitting easy and rapid removal and replacement of the cutter wheel.

In the accompanying drawings forming a part of this specification, and in which like numerals are employed to designate like parts throughout the same.

Figure 1:
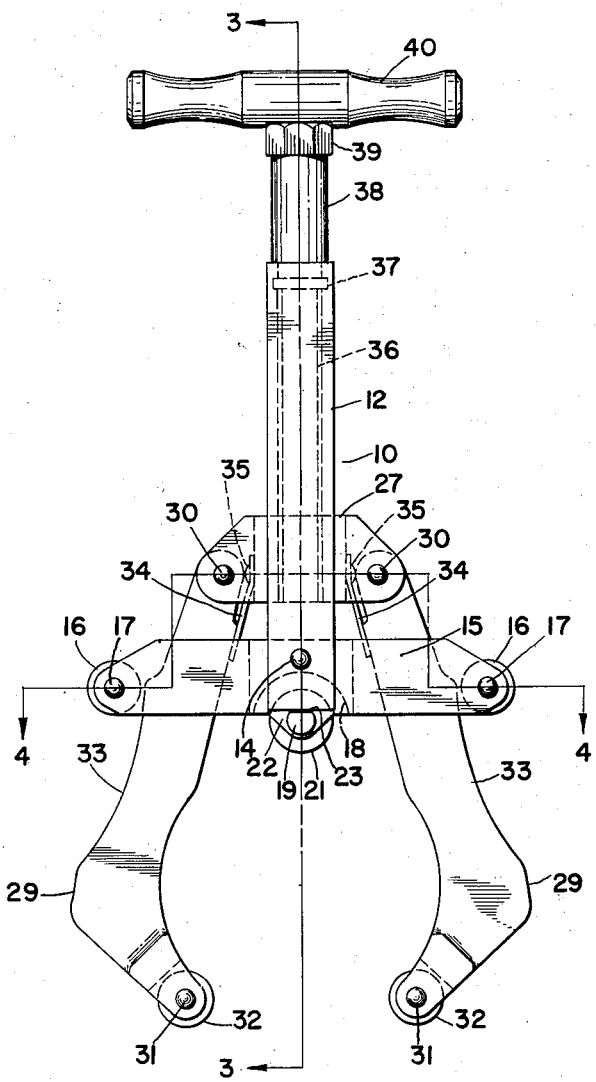
Fig. 1 is a front elevational view of the tubing cutter, with the parts shown substantially in position for cutting the maximum size of tubing for which the cutter is adapted.

Referring more particularly to the drawings, the cutter will be seen to comprise an inverted U-shaped guide member, generally designated by reference character 10 and consisting of a transverse portion 11 and dependent spaced legs 12 and 13.

Figure 6:
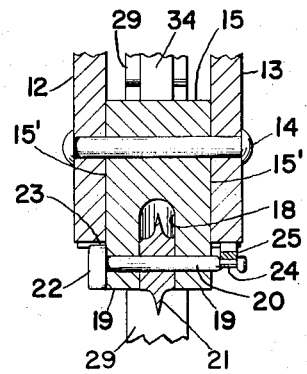
Fig. 6 is a fragmentary cross-sectional view, taken on the line 6—6 of Fig. 5.

Secured to the lower ends of the legs 12 and 13, as by means of a rivet 14 is a housing 15 having bifurcated ends, in which rollers 16 are journalled, as by means of pins 17. The housing 15 is provided in its outer faces with recesses 15' (see Fig. 6), in which the lower ends of the legs 12 and 13 are disposed whereby the housing is rigidly locked to the guide member 10 and cannot rotate about the rivet 14, with respect to the guide member.

Figure 2:
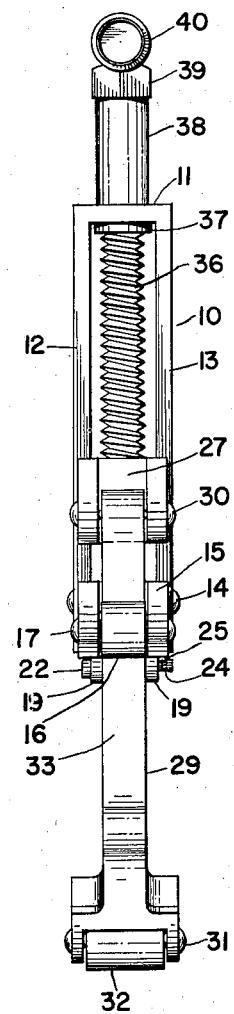
Fig. 2 is a side elevational view of the cutter, as viewed from the right side of Fig. 1.
Figure 3:
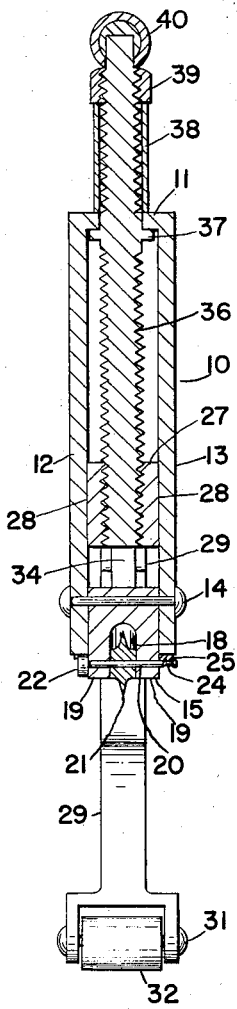
Fig. 3 is a vertical cross-sectional view, taken on the line 3—3 of Fig. 1.

The frame member 15 is provided in its lower face with a semi-circular recess or cavity 18 (see Figs. 1, 3 and 6), flanked by dependent ears 19, in which a shaft 20 is mounted. Journalled for rotation on the shaft 20, between the ears 19, is an alloy steel cutter wheel 21. One end of the shaft 20 is provided with a head 22, which is flattened, as at 23, where it confronts the lower end of the leg 12, so as to prevent rotation of the shaft and consequent wear thereof in its bearings. The other end of the shaft 20 projects beyond the frame member 15 and has formed therein a circumferential groove 24 (see Figs. 2, 3 and 6).

Figure 5:
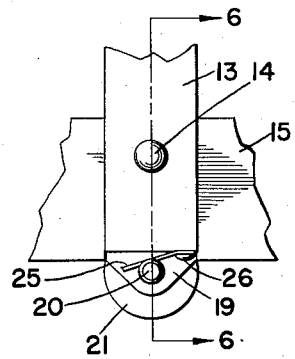
Fig. 5 is a fragmentary elevational view, on an enlarged scale of a portion of the cutter, as viewed from the right side of Fig. 2.

For the purpose of retaining the shaft 20 against axial displacement, a flat spring 25 is provided, one end of which is secured to the lower end of the leg 13, as by a pin 26 (Fig. 5), and the other end of which is disposed in the groove 24 and bears resiliently on the shaft 20. The spring 25 thus is effective to prevent displacement of the shaft 20 during use of the cutter, yet is easily accessible to permit it to be quickly lifted out of the groove 24 when it is desired to remove the shaft and replace the cutter wheel 21. This is therefore a highly advantageous feature of the invention.

Figure 4:
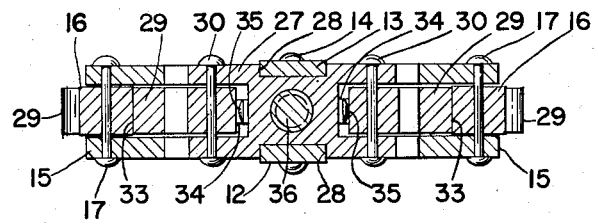
Fig. 4 is a transverse cross-sectional view, taken on the line 4—4 of Fig. 1.

The tubing cutter further includes a guide block 27 which is disposed between the legs 12 and 13 of the guide member 10, and is reciprocable along this member. It is provided in its outer faces with recesses 28 (Figs. 3 and 4) in which the legs 12 and 13 are received, whereby the guide block is guided in its movements by the guide member.

The guide block is bifurcated at its ends for the reception of the upper ends of cam members 29, which are pivoted to pins 30 mounted in the block 27. The cam members 29 extend downwardly through the bifurcated ends of the housing 15, interiorly of the rollers 16, and are provided at their lower ends with pins or shafts 31, on which rollers 32 are journalled. The cam members 29 are provided with arcuate cam surfaces 33 which serve a purpose to be presently described, these surfaces being normally biased against the rollers 16 by means of flat springs 34, the upper ends of which are secured to the guide block 27 by means of pins 35 (see Figs. 1, 3, 4 and 6).

For the purpose of reciprocating the guide block 27 along the guide member 10, a screw 36 is provided, which is secured to the transverse portion 11 of the guide member, as by means of an annular flange 37 on the screw, which abuts the portion 11, a spacer 38, which abuts the upper face of the portion 11, and a nut 39, secured to the upper end of the screw 36, and which retains the spacer in position.

The screw 36 is threaded to the guide block 27, and is provided at its upper end with a transversely extending handle 40, by means of which the screw is rotated to raise or lower the guide block.

The use of the cutter will be obvious to those skilled in the art, but may be briefly explained as follows.

The tubing which is to be cut is entered between the cam members 29, so as to be engaged at circumferentially-spaced points by the rollers 32. The handle 40 is then rotated, so as to bring the cutter wheel 21 against the tubing, after which the cutter is rotated about the tubing by means of the handle, with pressure simultaneously exerted against the tubing by the cutter wheel until the tubing has been cut.

An important feature of the invention resides in the fact that not only is the tubing cutter adapted for cutting a large variety of sizes of tubing, from a small fraction of an inch in diameter to a diameter of several inches, but that irrespective of the size of the tubing which is being cut, the points of engagement of the cutter wheel 21 and support rollers 32 with the tubing will always be substantially equidistant from each other circumferentially of the tubing. This is a distinct advantage, in that it provides stability for the cutter during the cutting operation, by preventing the cutter from moving or deviating from the cutting plane, as is possible in cutters in which the distance between the rollers 32 is fixed and cannot be varied in proportion to the size of the tubing which is being cut. Expressed in another manner, the three point contact of the cutter with the tubing, with the points of contact substantially uniformly spaced about the circumference of the tubing, remains unchanged, irrespective of the size of the tubing which is being cut.

Another important feature of the invention resides in the provision of the springs 34 which function to automatically bias the surfaces 33 of the cam members 29 against the rollers 16 at all times during adjustment of the cutter for cutting various sizes of tubing. This, in conjunction with the fact that the surfaces 33 are arcuate, acts to automatically position the rollers 32 at the proper distance from each other during such adjustment, and relieves the user of the cutter from any work or anxiety in this connection.

Another feature of the invention is the symmetrical arrangement of the cam members 29 and other parts of the cutter, which act to balance the cutter at all times and facilitates handling and use of the cutter.

It is to be understood that the form of my invention, herewith shown and described, is to be taken as a preferred example of the same, and that various changes may be made in the shape, size and arrangement of parts of my invention, without departing from the spirit of the invention or the scope of the subjoined claims.

Having thus described my invention, I claim

1. In a tubing cutter of the character described, a guide member, a housing secured to said guide member, a cutter wheel rotatably mounted in said housing, a guide block, means for reciprocably moving said block along said guide member, and roller-supporting members pivotally secured to said guide block.

2. A tubing cutter, as defined in claim 1, including rollers mounted in said housing adjacent the ends thereof.

3. A tubing cutter, as defined in claim 3, in which said roller-supporting members extend through said housing, and means are provided for automatically biasing said roller-supporting members against the housing rollers.

4. A tubing cutter, as defined in claim 3, in which a shaft is mounted on said housing on which said cutter wheel rotates, and spring means are provided for automatically locking said shaft against axial displacement.

5. A tubing cutter, as defined in claim 4, in which said roller-supporting members are provided with arcuate cam surfaces which bear against the housing rollers.

6. In a tubing cutter of the character described, a guide member, screw means mounted for rotation in said guide member, a handle for rotating said screw means, a guide block mounted for movement along said guide member and movable by said screw means, a pair of cammable members pivotally secured to said guide block and movable independently of each other, each of said cammable members supporting a roller adapted for engagement with the tubing to be cut, a housing secured to said guide member below said guide block, and a cutter wheel, rotatably supported by said housing.

7. A tubing cutter, as defined in claim 6, including rollers mounted in said housing adjacent the ends thereof.

8. A tubing cutter, as defined in claim 7, in which said roller-supporting members extend through said housing, and means are provided for resiliently biasing said cammable members against the housing rollers.

9. A tubing cutter, as defined in claim 8, in which said cammable members are provided with arcuate cam surfaces which bear against the housing rollers.

References Cited in the file of this patent

UNITED STATES PATENTS

| | | |
|---|---|---|
| 500,443 | Tyler | June 27, 1893 |
| 1,138,395 | Nelson | May 4, 1915 |